United States Patent
Hamano et al.

(10) Patent No.: US 7,227,699 B2
(45) Date of Patent: Jun. 5, 2007

(54) ZOOM LENS SYSTEM AND IMAGE PICK-UP APPARATUS INCLUDING SAME

(75) Inventors: Hiroyuki Hamano, Koga (JP); Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 11/458,768

(22) Filed: Jul. 20, 2006

(65) Prior Publication Data

US 2007/0019303 A1 Jan. 25, 2007

(30) Foreign Application Priority Data

Jul. 22, 2005 (JP) ............................. 2005-213051

(51) Int. Cl.
*G02B 15/14* (2006.01)

(52) U.S. Cl. .................. 359/687; 359/683; 359/684
(58) Field of Classification Search ......... 359/676–692
See application file for complete search history.

(56) References Cited

U.S. PATENT DOCUMENTS

| 6,049,431 | A | * | 4/2000 | Tochigi | 359/687 |
| 6,414,800 | B1 | | 7/2002 | Hamano | 359/687 |
| 6,473,231 | B2 | | 10/2002 | Hamano et al. | 359/557 |
| 6,606,194 | B2 | | 8/2003 | Hamano et al. | 359/557 |
| 6,972,909 | B2 | * | 12/2005 | Hamano et al. | 359/687 |

FOREIGN PATENT DOCUMENTS

| JP | 07-128619 A | 5/1995 |
| JP | 10-260356 A | 9/1998 |
| JP | 11-237550 A | 8/1999 |
| JP | 2001-066500 A | 3/2001 |
| JP | 2002-244037 A | 8/2002 |

* cited by examiner

*Primary Examiner*—Ricky Mack
*Assistant Examiner*—Mohammed Hasan
(74) *Attorney, Agent, or Firm*—Canon U.S.A., Inc. Intellectual Property Division

(57) ABSTRACT

At least one exemplary embodiment is directed to a four-group zoom lens system including, in order from the object side to the image side, a first lens unit having positive refractive power, a second lens unit having negative refractive power, a third lens unit having positive refractive power and including a negative first lens sub-unit and a positive second lens sub-unit in order from the object side to the image side, and a fourth lens unit having positive refractive power. During zooming, the second and fourth lens units can be moved along an optical axis and the second lens sub-unit can be moved substantially orthogonal to the optical axis. When f1 represents the focal length of the first lens unit, f3a and f3b represents the focal length of the first and second lens sub-units, respectively, satisfy $0.4 < f3b/f1 < 0.70$ and $0.5 < |f3b/f3a| < 0.8$.

8 Claims, 7 Drawing Sheets

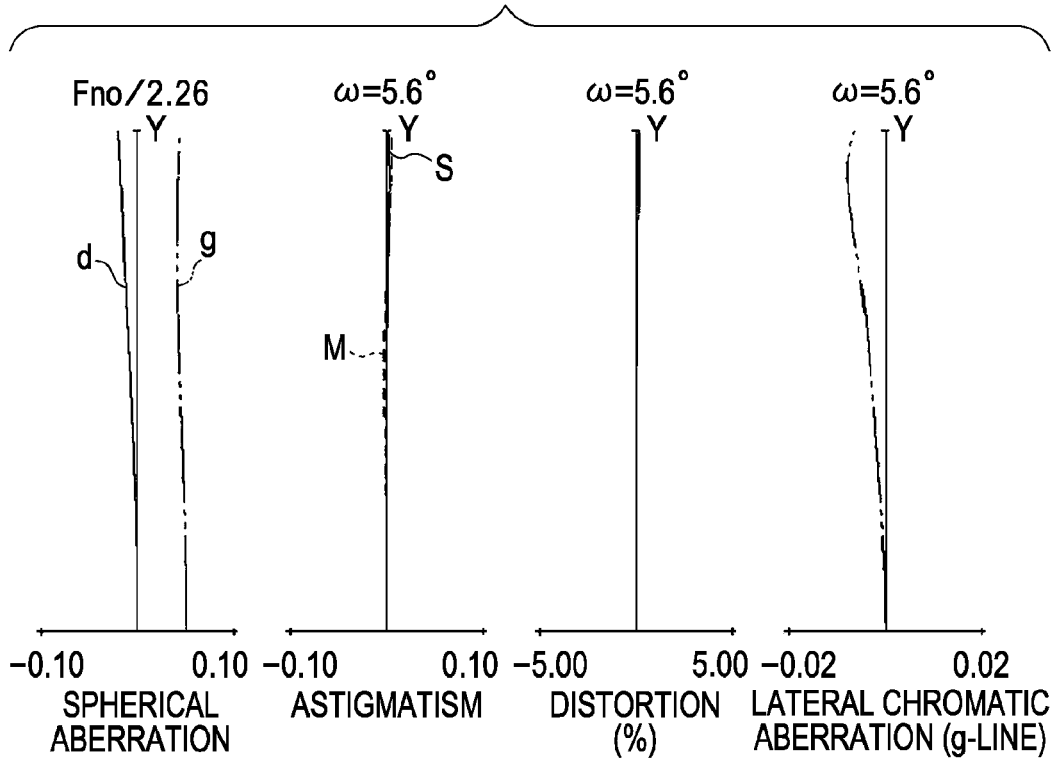
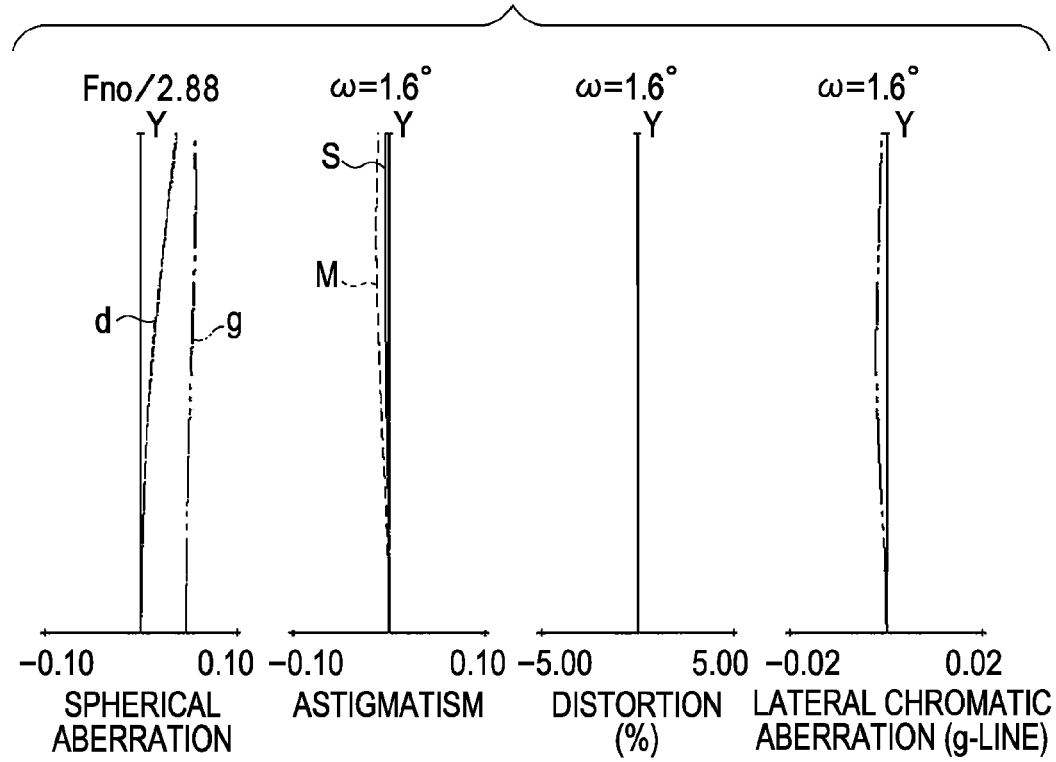

ZOOM LENS SYSTEM AND IMAGE PICK-UP APPARATUS INCLUDING SAME

BACKGROUND OF THE INVENTION

1. Field of the Invention

The present invention relates to a zoom lens system. More specifically, though not exclusively, the invention relates to a zoom lens system that can be used as an image pick-up optical system in an image pick-up apparatus.

2. Description of the Related Art

If vibration is generated in the image pick-up system when capturing an image of an object, the captured image can be blurry. To prevent such blurring of the captured image, various known vibration control optical systems have been discussed.

Many known zoom lens systems, functioning as photographic systems, compensate for blurring of an image by displacing some lens groups.

There is a known zoom lens system including four groups of lenses, i.e., a first lens group having positive refractive power, a second lens group having negative refractive power, a third lens group having positive refractive power, and a fourth lens group having positive refractive power, disposed in order from the object side to the image side of the lens system. This zoom lens system facilitates obtaining a still image by vibrating the entire third lens group in a direction orthogonal to the optical axis (refer to Japanese Patent Laid-Open No. 10-260356).

The assignee of the present invention has proposed a four-group zoom lens system having a vibration control function. The lens groups of the zoom lens system includes a first lens group having positive refractive power, a second lens group having negative refractive power, a third lens group having positive refractive power, and a fourth lens group having positive refractive power. An aperture stop is provided between the second lens group and the third lens group. The third lens group is divided into a negative lens sub-group having negative refractive power and a positive lens sub-group having positive refractive power. The positive lens sub-group is vibrated in a direction orthogonal to the optical axis to obtain a still image (for example, refer to Japanese Patent Laid-Open Nos. 7-128619, 11-237550, and 2002-244037).

The assignee has also proposed a zoom lens system, which can have the same structure as that of the above-described four-group zoom lens system, except that the third lens group is divided into two positive lens sub-groups having positive refractive power and one of the positive lens sub-groups is vibrated in a direction orthogonal to the optical axis to obtain a still image (for example, refer to Japanese Patent Laid-Open No. 2001-66500).

In general, an image pick-up system in which vibration is controlled by decentering some lens groups in a direction orthogonal and parallel to the optical axis is useful because a special additional optical system for controlling vibration is not required.

However, there are problems in that space for moving the lens groups is required within the optical path and that eccentric aberration can be generated while controlling vibration.

Recently, some commercially available cameras have employed a three charge coupled device (3CCD) system to improve the quality of a captured image.

There is a strong desire for a zoom lens system supporting a 3CCD system to have a high zoom ratio and a vibration control function for controlling the blurring of a captured image caused by the vibration (tilting) of the zoom lens system.

In particular, there is a strong desire for a zoom lens system, which can have a small optical system including a highly sensitive eccentric lens group, which is the lens group placed to control vibration.

However, in an optical system that controls vibration by decentering a lens group in a direction orthogonal to the optical axis, an increase the vibration control sensitivity and an increase in the zoom ratio cause an increase in eccentric aberration and a decrease in optical performance.

In particular, it can be difficult to compensate for the aberration that is generated while a lens unit is decentered at the telephoto side.

Therefore, it can be useful for a zoom lens system, which can have a vibration control mechanism, to have an optical performance that is not degraded while blurring is corrected or error reduced and with suitable vibration control sensitivity.

SUMMARY OF THE INVENTION

The present invention relates to a zoom lens system that can be used as an image pick-up optical system in an image pick-up apparatus (e.g., a video camera, a camera for silver halide photography, a digital camera or other image pick-up apparatus as known by one of ordinary skill in the art and equivalents).

At least one exemplary embodiment is directed to a zoom lens system which can have a small optical system and a vibration control mechanism for maintaining excellent image quality while carrying out vibration control.

At least one exemplary embodiment is directed to a zoom lens system including a first lens unit having positive refractive power, a second lens unit having negative refractive power, a third lens unit having positive refractive power, and a fourth lens unit having positive refractive power. The first to fourth lens units are provided in order from the object side to the image side. The third lens unit includes a first lens sub-unit having negative refractive power and a second lens sub-unit having positive refractive power, the first and second lens sub-units provided in order from the object side to the image side. During zooming, the second lens unit and the fourth lens unit are moved along an optical axis and the second lens sub-unit is moved in a direction substantially orthogonal to the optical axis so as to displace the image. The following conditions can be satisfied:

$$0.4 < f3b/f1 < 0.70 \text{ and}$$

$$0.5 < |f3b/f3a| < 0.8$$

where f1 represents the focal length of the first lens unit, f3a represents the focal length of the first lens sub-unit, and f3b represents the focal length of the second lens sub-unit.

Further features of the present invention will become apparent from the following description of exemplary embodiments (with reference to the attached drawings).

BRIEF DESCRIPTION OF THE DRAWINGS

FIG. 7 illustrates the aberration at an intermediate zoom position of a zoom lens system according to the second exemplary embodiment of the present invention.

FIG. 8 illustrates the aberration at the telephoto end of a zoom lens system according to the second exemplary embodiment of the present invention.

DESCRIPTION OF THE EMBODIMENTS

Figure 1:
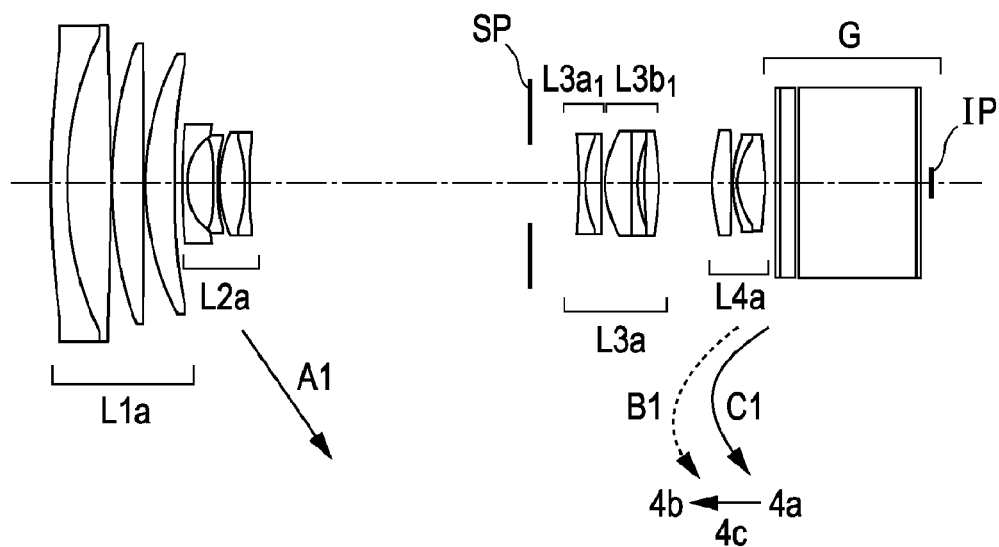
FIG. 1 illustrates a cross-sectional view of lenses at the wide angle end of a zoom lens system according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and radius of curvature, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., vibration), a reduction of the error and/or a correction of the error is intended.

EXEMPLARY EMBODIMENTS

A zoom lens system according to an exemplary embodiment of the present invention and an image pick-up apparatus including the zoom lens system will be described below with reference to the drawings.

Figure 2:
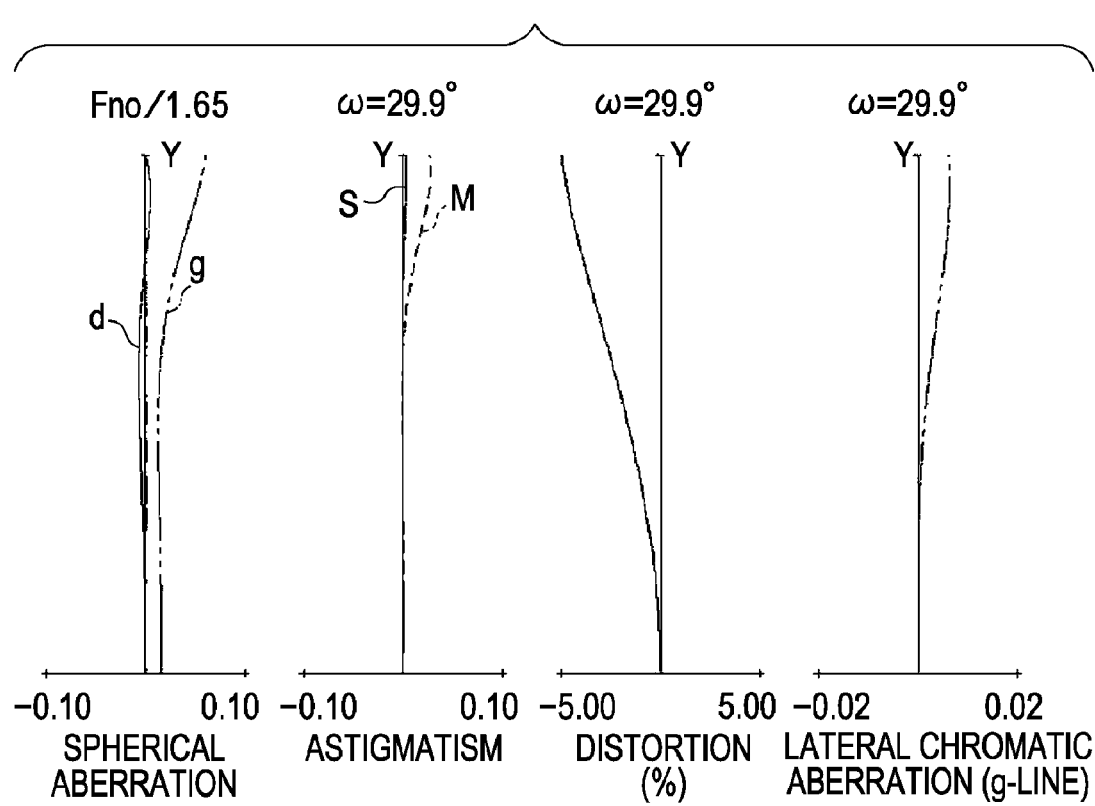
FIG. 2 illustrates the aberration at the wide angle end of a zoom lens system according to the first exemplary embodiment of the present invention.
Figure 3:
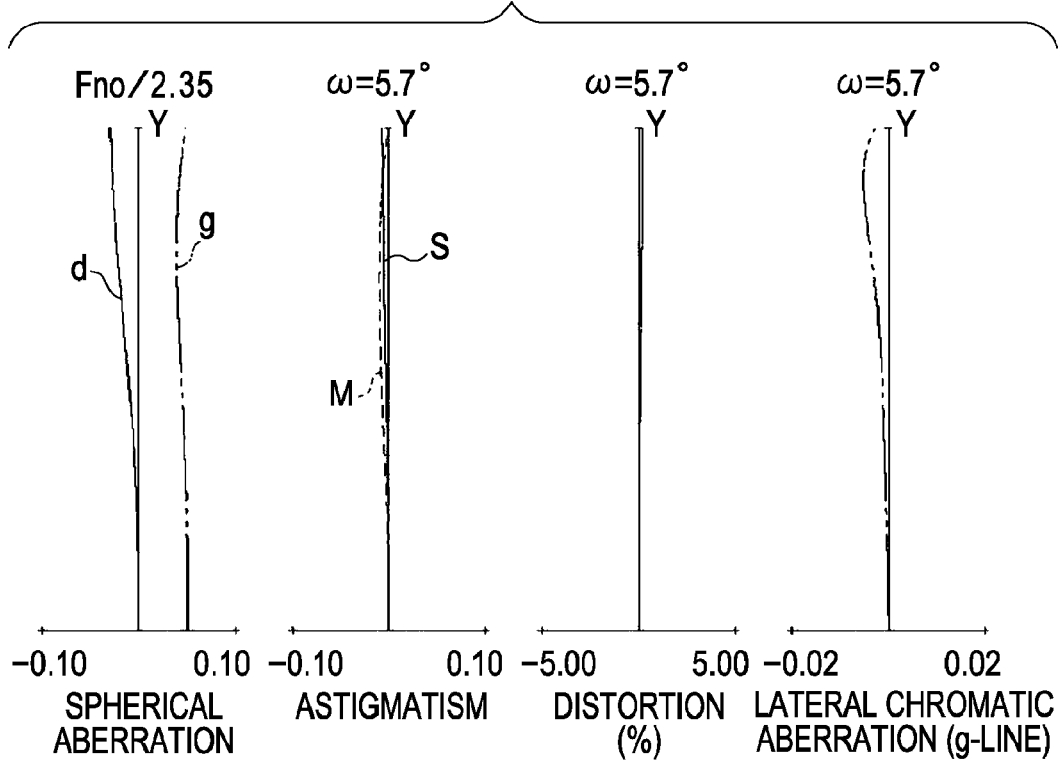
FIG. 3 illustrates the aberration at an intermediate zoom position of a zoom lens system according to the first exemplary embodiment of the present invention.
Figure 4:
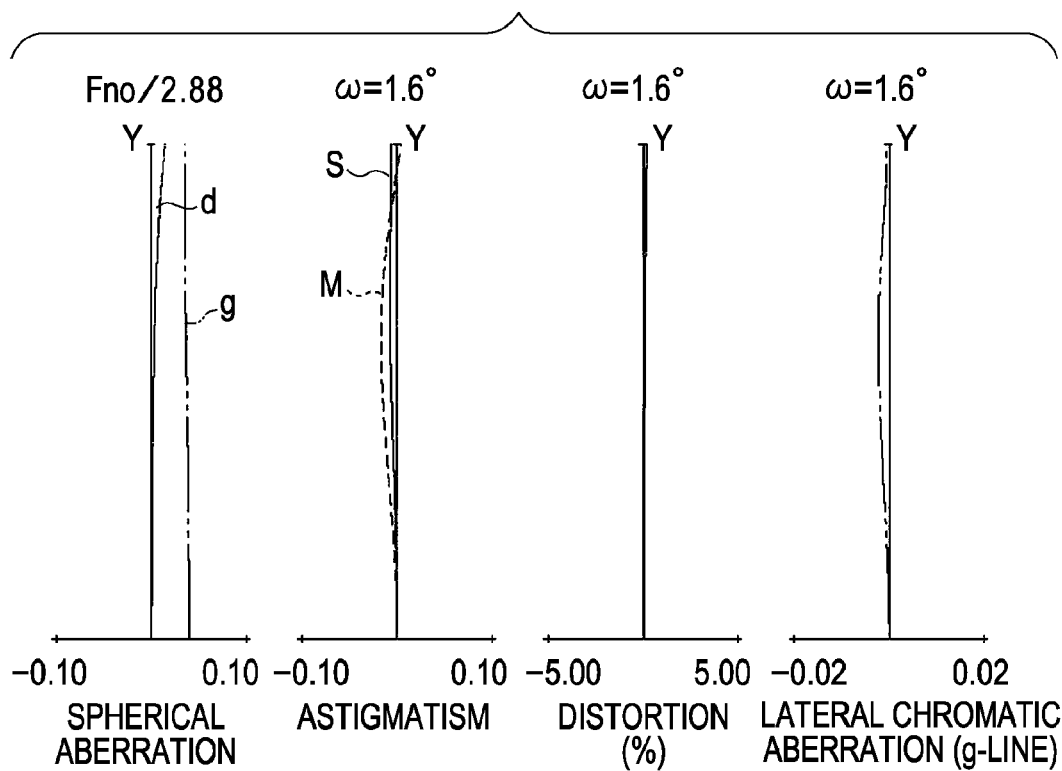
FIG. 4 illustrates the aberration at the telephoto end of a zoom lens system according to the first exemplary embodiment of the present invention.

FIG. 1 illustrates a cross-sectional view of lenses at the wide angle end of a zoom lens system according to a first exemplary embodiment of the present invention. FIGS. 2, 3, and 4 illustrate the aberration at the wide angle end, the intermediate zoom position, and the telephoto end, respectively, of a zoom lens system according to the first exemplary embodiment of the present invention when the zoom lens system is focused on an object at infinity.

Figure 5:
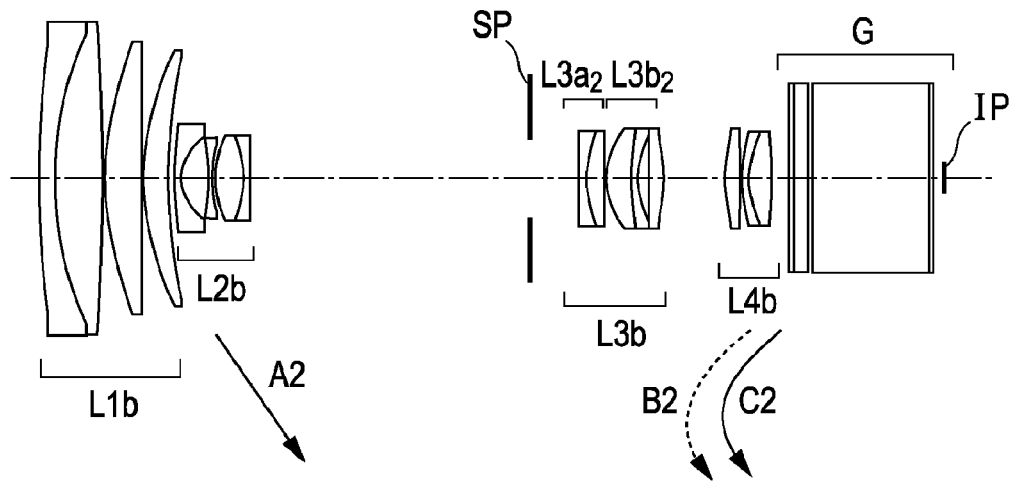
FIG. 5 illustrates the aberration at the wide angle end of a zoom lens system according to a second exemplary embodiment of the present invention.
Figure 6:
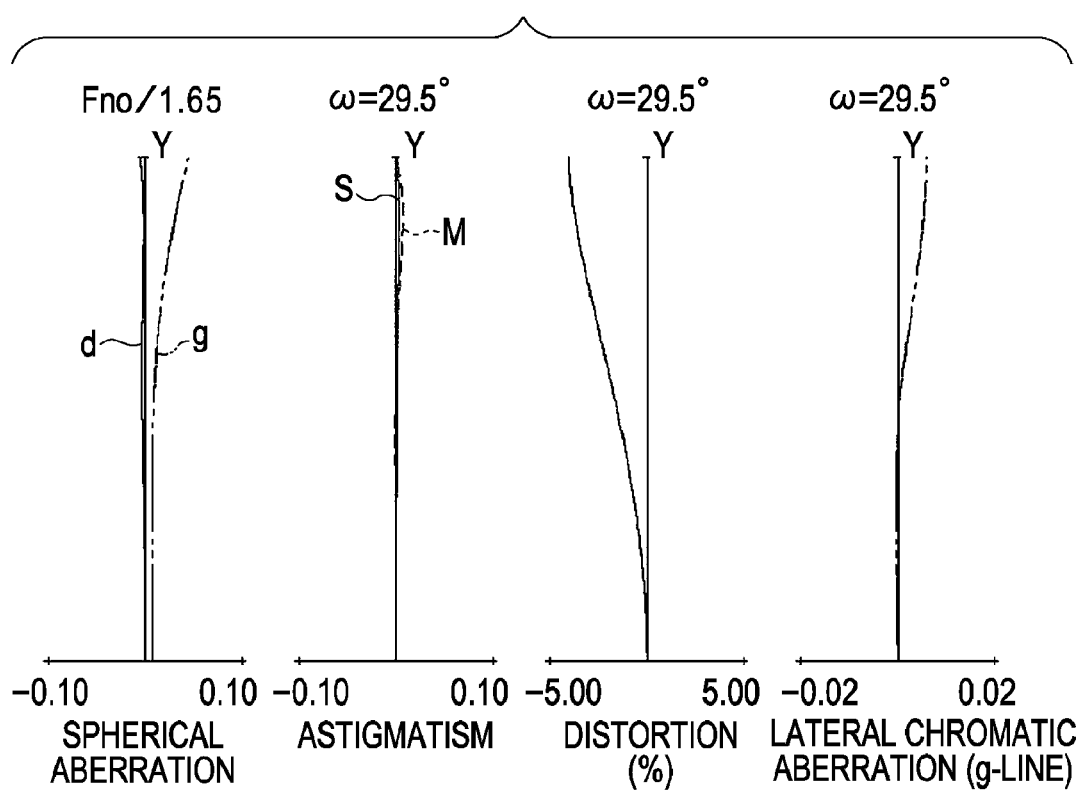
FIG. 6 illustrates the aberration at the wide angle end of a zoom lens system according to the second exemplary embodiment of the present invention.

FIG. 5 illustrates a cross-sectional view of lenses at the wide angle end of a zoom lens system according to a second exemplary embodiment of the present invention. FIGS. 6, 7, and 8 illustrate the aberration at the wide angle end, the intermediate zoom position, and the telephoto end, respectively, of a zoom lens system according to the second exemplary embodiment of the present invention when the zoom lens system is focused on an object at infinity.

Figure 9:
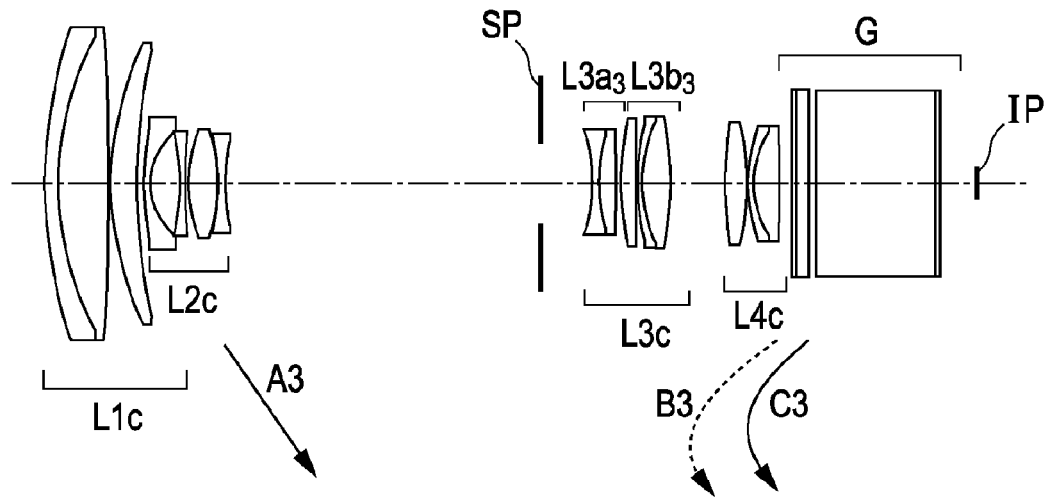
FIG. 9 illustrates a cross-sectional view of lenses at the wide angle end of a zoom lens system according to a third exemplary embodiment of the present invention.
Figure 10:
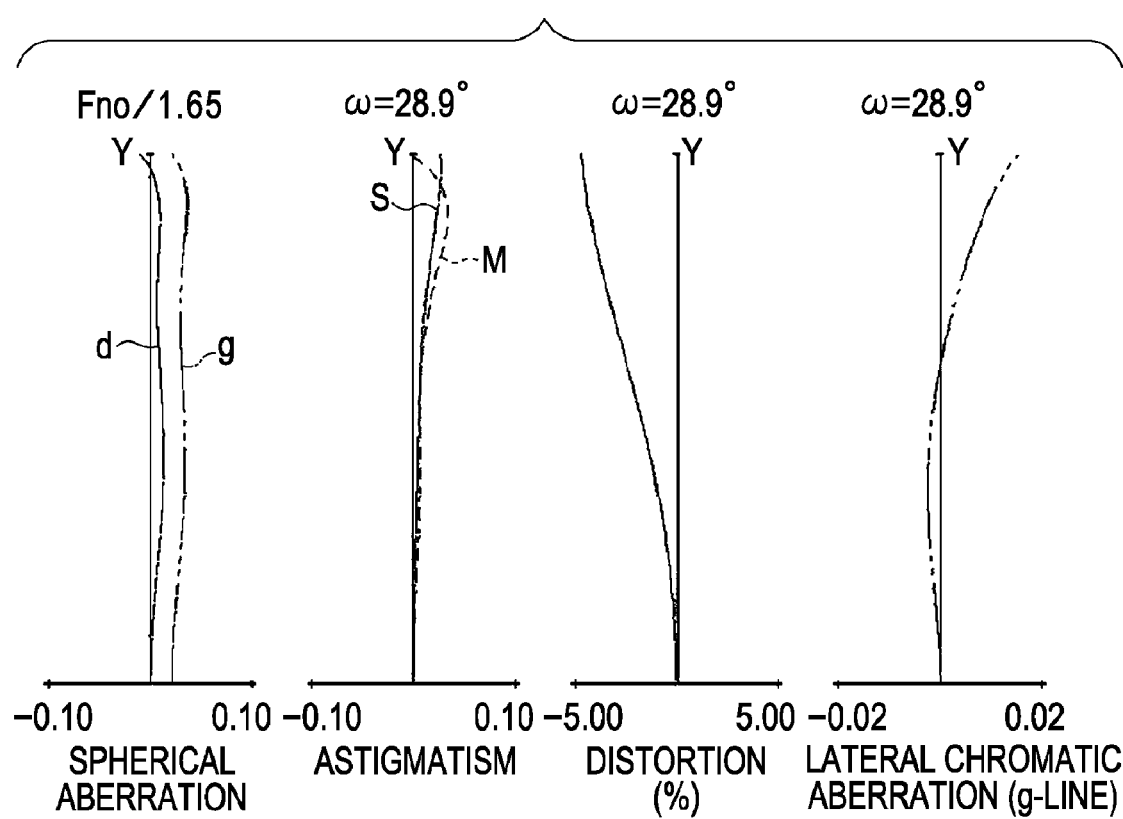
FIG. 10 illustrates the aberration at the wide angle end of a zoom lens system according to the third exemplary embodiment of the present invention.
Figure 11:
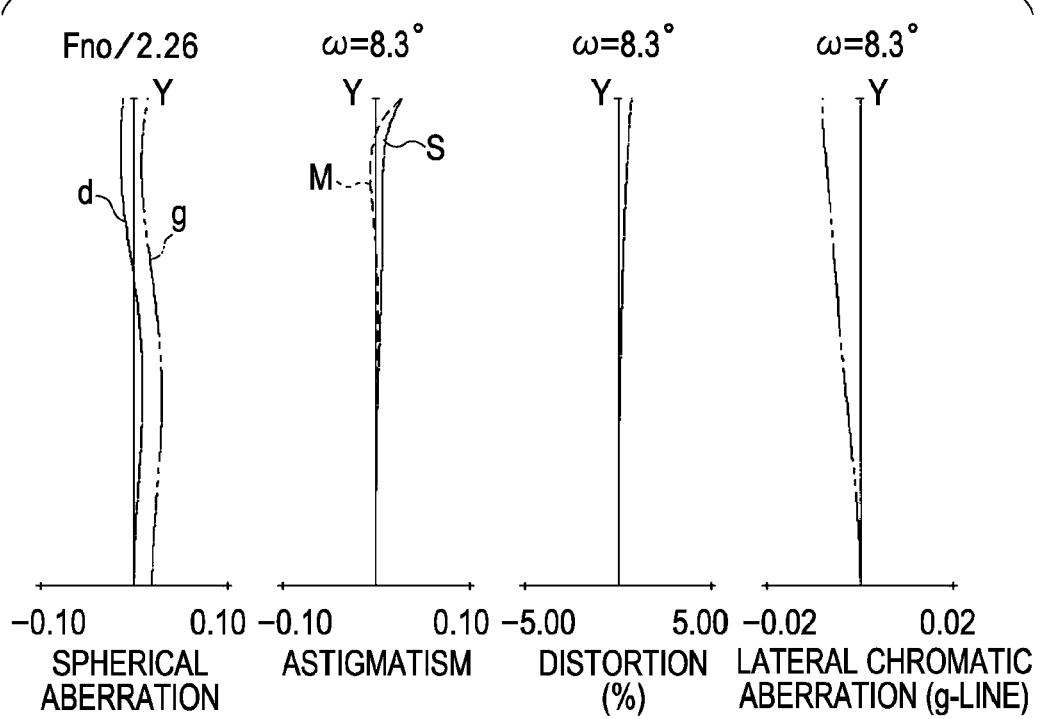
FIG. 11 illustrates the aberration at an intermediate zoom position of a zoom lens system according to the third exemplary embodiment of the present invention.
Figure 12:
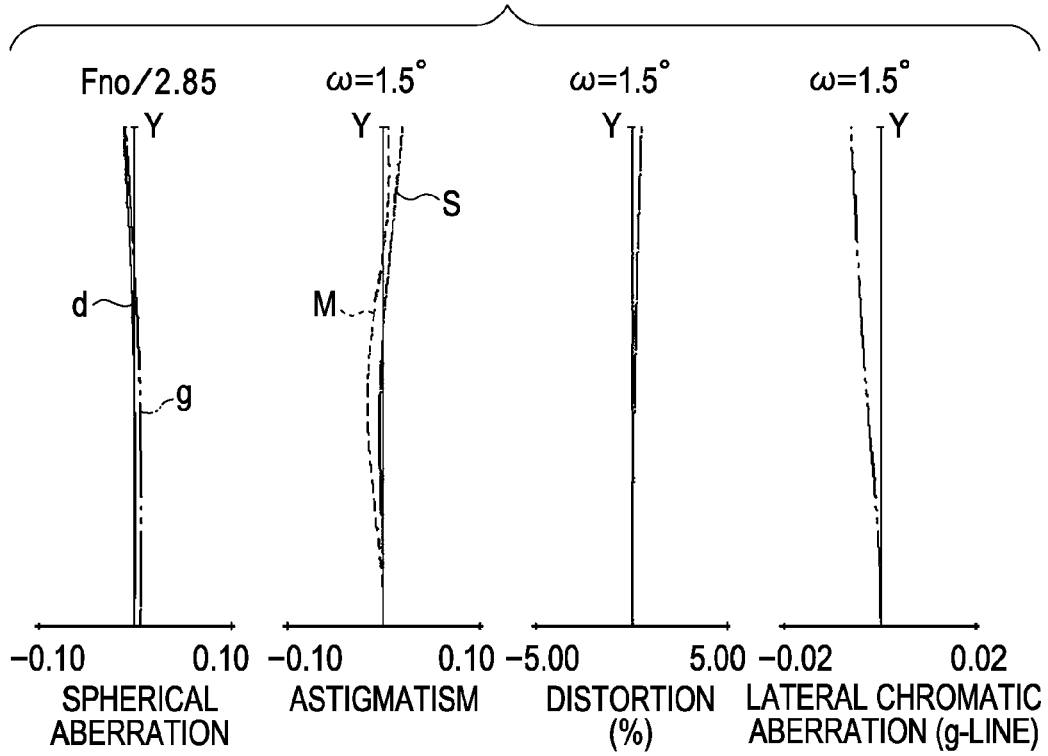
FIG. 12 illustrates the aberration at the telephoto end of a zoom lens system according to the third exemplary embodiment of the present invention.

FIG. 9 illustrates a cross-sectional view of lenses at the wide angle end of a zoom lens system according to a third exemplary embodiment of the present invention. FIGS. 10, 11, and 12 illustrate the aberration at the wide angle end, the intermediate zoom position, and the telephoto end, respectively, of a zoom lens system according to the third exemplary embodiment of the present invention when the zoom lens system is focused on an object at infinity.

Figure 13:
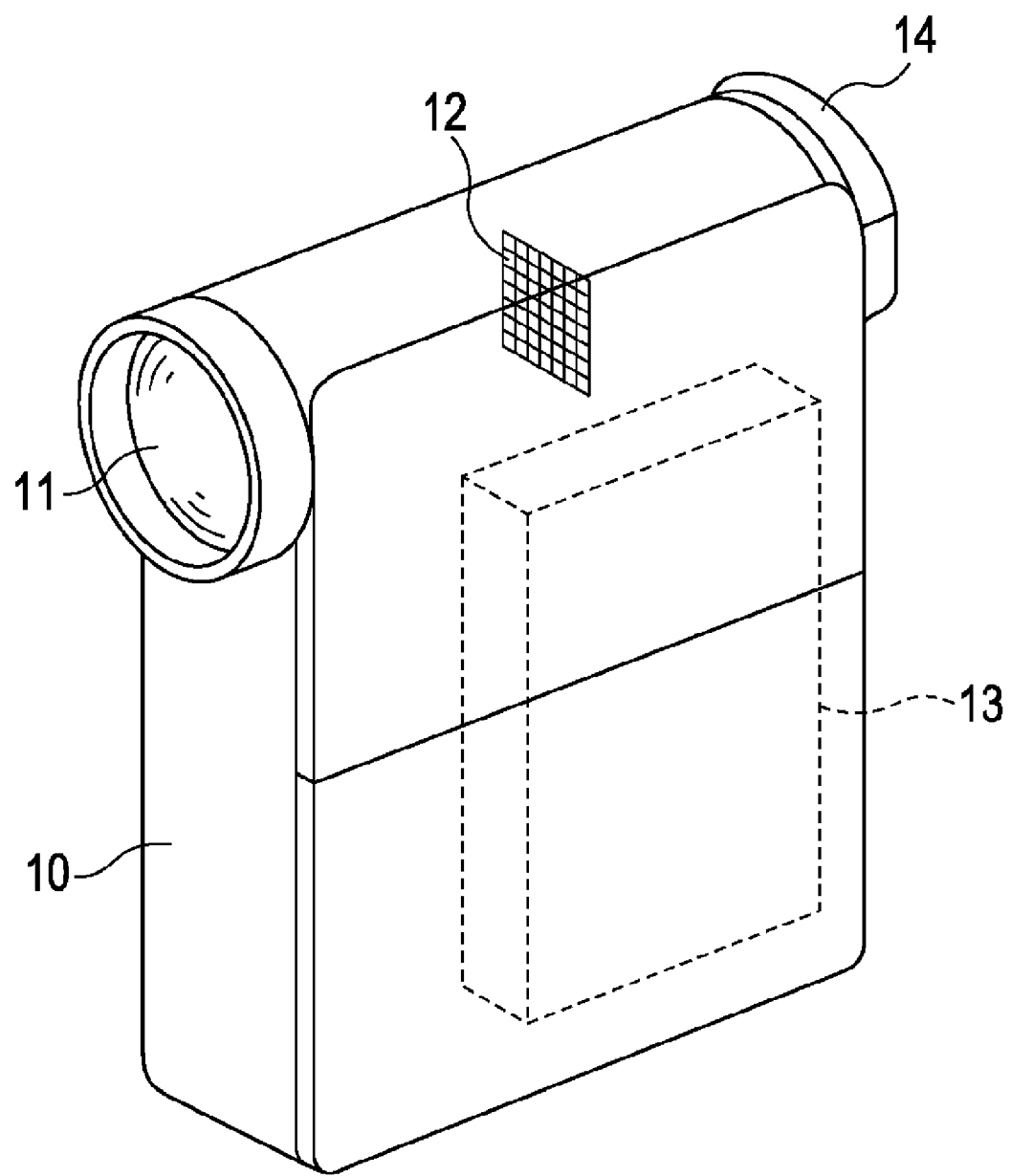
FIG. 13 illustrates a schematic view of the main components of an image pick-up apparatus according to an exemplary embodiment of the present invention.

FIG. 13 illustrates a schematic view of the main components of a video camera (image pick-up apparatus) including a zoom lens system according to an exemplary embodiment of the present invention.

The cross-sectional views of FIGS. 1, 5, and 9 each illustrate a first lens unit L1$a$-$c$ having positive refractive power ([optical power]=[inverse of focal length]), a second lens unit L2$a$-$c$ having negative refractive power, a third lens unit L3$a$-$c$ having positive refractive power, and a fourth lens unit L4$a$-$c$ having positive refractive power.

The third lens unit L3$a$-$c$ includes a first lens sub-unit L3$a$1-3 having negative refractive power and a second lens sub-unit L3$b$1-3 having positive refractive power. The second lens sub-unit L3$b$1-3 is capable of moving in a direction orthogonal (i.e., substantially orthogonal) to the optical axis so as to control and/or reduce vibration (i.e., to control the displacement of a captured image). To control vibration, the lens sub-unit L3$b$ can instead be pivoted (rotated) around a point on the optical axis. If the lens sub-unit L3$b$1-3 for vibration control is moved in a direction including a vector component orthogonal to the optical axis, the lens unit can be moved on the image plane.

The zoom lens system includes an optical block G equivalent to an optical filter or a face plate. An image plane IP is equivalent to the image pick-up plane of a solid state image pick-up device (photoelectric transducer), such as a CCD sensor or a complementary metal-oxide semiconductor (CMOS) sensor, when the zoom lens system is used as an image pick-up optical system in an image pick-up apparatus (e.g., a video camera or a digital still camera or is equivalent to a film surface when the zoom lens system is used as an image pick-up optical system in a silver halide camera). An aperture stop SP is provided on the object side of the lens sub-unit L3$a$1-3.

The drawings illustrating aberration show d-lines d, g-lines g, meridional image planes M, and sagittal image planes S. The lateral chromatic aberration is represented by the g-line. The drawings also show F numbers Fno and half field angles ω. The Y-axis in the spherical aberration's graph is entrance pupil radius, the Y-axis in the astigmatism's, distortions and chromatic aberration of magnification's graphs is image height.

According to the exemplary embodiments, the zoom positions at the wide angle end and the telephoto end correspond to the zoom positions when the magnification lens unit (i.e., the second lens unit L2$a$-$c$ according to the exemplary embodiments) is at one of the ends of the optical axis of the mechanism within the movable range of the lens unit.

According to the exemplary embodiments, when zooming is carried out from a position at the wide angle end to a zoom position at the telephoto end, the second lens unit L2a-c is moved (e.g., A1–A3) toward the image for magnification. Contemporaneously, fluctuation in the image plane caused by the magnification is compensated for by moving (e.g., B1–B3) the fourth lens unit L4a-c toward the object along a partial convex trajectory.

The zoom lens system employs a rear focusing system in which focusing is carried out by moving the fourth lens unit L4 along the optical axis. A solid curved line 4a and a dotted curved line 4b of the fourth lens unit L4a in the drawing of the zoom lens system represent the trajectories of the fourth lens unit L4a-c moved to compensating for the fluctuation in the image plane while zooming in from the wide angle end to the telephoto end when focusing on an object at an infinite distance and a close object, respectively.

By moving (e.g., B1–B3) the fourth lens unit L4a-c along a convex trajectory toward the object, the space between the third lens unit L3a-c and the fourth lens unit L4a-c can be efficiently used. Consequently, the entire length of the zoom lens system can be effectively shortened. The first lens unit L1a-c and the third lens unit L3a-c are not moved during zooming and focusing operations.

According to the exemplary embodiments, for example, when focusing is carried out at a zoom position at the telephoto end from an object at an infinite distance to a close object, the fourth lens unit L4a is moved forward, as indicated by the arrow 4c in the drawing.

According to the exemplary embodiments, blurring of an image caused by the vibration of the entire optical system is corrected or error reduced by moving the lens unit (vibration control lens unit) L3b1-3 in a direction orthogonal to the optical axis.

In other words, vibration is controlled. In this way, vibration is controlled without additional optical members, such as a variable apex angle prism, or a vibration control lens unit. Thus, the entire size of the optical system is prevented from being great.

Next, vibration control carried out by the lens sub-unit L3b1-3 according to the exemplary embodiments will be described.

In general, the optical axis of a zoom lens system can be tilted by shaking of the user's hands.

At this time, to compensate for the tilt θ° of the optical axis, a vibration control lens unit (equivalent to the lens sub-unit L3b1-3 according to the exemplary embodiments) will be moved by a distant Δ in a direction orthogonal to the optical axis. The distance Δ (i.e., amount of shift) of the vibration control lens unit is represented by the following expression:

$$\Delta = f \tan(\theta)/TS$$

where f represents the focal length of the entire zoom lens system and TS represents the eccentricity sensitivity of the vibration control lens unit.

Here, the eccentricity sensitivity TS is represented as the following:

$$TS = \Delta I/\Delta L$$

where ΔL represents the distance the vibration control lens unit is moved in a direction orthogonal to the optical axis and ΔI represents the distance the image is moved on the image place contemporaneously.

If the eccentricity sensitivity TS of the vibration control lens unit is too small, the distance the vibration control lens unit is moved becomes great to obtain the predetermined distance ΔI. Thus, the effective lens diameter of the vibration control lens unit is increased.

A zoom lens system in a video camera supporting a 3CCD requires a greater back focus length compared with that of a normal single-plate type zoom lens system because a greater space for disposing a prism for color separation can be used on the side of the image plane. Thus, for the zoom lens system according to at least one exemplary embodiment, the refractive power of the third lens unit L3a-c is weaker compared with that of the fourth lens unit L4a-c and the sensitivity in a direction orthogonal to the optical axis of the third lens unit L3a-c is small.

Accordingly, if vibration control is carried out by moving the entire third lens unit L3a-c in a direction orthogonal to the optical axis, the distance the third lens unit L3a-c is moved becomes too great.

A zoom lens system for a video camera often includes a four-group zoom lens system having lens units with positive, negative, positive, and positive refractive powers, in the same manner as the zoom lens system according to at least one exemplary embodiment.

For such a zoom lens system, when the eccentricity sensitivity of the third lens unit L3a-c is increased, the refractive power of the third lens unit L3a-c can also be increased. Thus, it becomes difficult to maintain a great back focus length. Consequently, the zoom lens system may not be suitable for, for example, a video camera supporting a 3CCD.

According to the exemplary embodiments, the third lens unit L3a-c is divided into the lens sub-unit L3a1-3 having negative refractive power and the lens sub-unit L3b1-3 having positive refractive power. The lens sub-unit L3b1-3 is selected as a vibration control lens unit, and, thus, its refractive power and eccentricity sensitivity TS are increased. In this way, although the zoom lens system can be used for a video camera supporting a 3CCD, it has a small size and facilitates vibration control.

According to the exemplary embodiments, the zoom lens system can achieve a high zoom ratio, such as a zoom ratio of 20 time, by suitably setting the focal length of the lens sub-unit L3b1-3 that is decentered for vibration control. Moreover, various eccentric aberrations, such as eccentric coma and eccentric image plane distortion, generated by the movement and/or decentering of the lens sub-unit L3b1-3 during vibration control are satisfactorily compensated for.

The zoom lens system according to the exemplary embodiments satisfies at least one of the following condition expressions.

In the expressions below, f1 and f2 represent the focal lengths of the first lens unit L1a-c and the second lens unit L2a-c, respectively, and f3a and f3b represent the focal lengths of the lens sub-unit L3a1-3 and the lens sub-unit L3b1-3, respectively.

The focal lengths of the entire optical system at the wide angle end and the telephoto end are represented by fw and ft, respectively.

The eccentricity sensitivity of the image displacement when the zoom lens system is focused on an object at an infinite distance at the telephoto end and when the lens sub-unit L3b1-3 is moved in a direction orthogonal to the optical axis is represented by TS.

Accordingly, the exemplary embodiments satisfy at least one of the following condition expressions:

$$0.4 < |f3b/f1| < 0.70 \quad (1)$$

$$0.5 < |f3b/f3a| < 0.8 \quad (2)$$

$$2.2 < |f3b/f2| < 4.1 \quad (3)$$

$$0.45 < |f2|/\sqrt{fw \cdot ft} < 0.58 \quad (4)$$

$$0.6 < TS < 1.0 \quad (5)$$

Next, the technical significance of the above condition expressions will be described.

Condition expressions 1 and 2 are provided to reduce the change in various aberrations during vibration control while reducing the entire size of the zoom lens system.

If the refractive power of the lens sub-unit L3b becomes great and, consequently, the lower limit of the condition expression 1 is surpassed, it becomes difficult to compensate for the eccentric aberrations, such as eccentric coma and eccentric image plane distortion, caused by the decentering of the lens unit. If the upper limit of the condition expression 1 is surpassed, the lens sub-unit L3b1-3 has to be moved a great distance for vibration control and the diameter of the lens tube will have to be increased.

If the lower limit of the condition expression 2 is surpassed, it becomes difficult to maintain a long back focus length for disposing a color separation optical system on the image side of the lens system. If the upper limit is surpassed, the lens sub-unit L3b1-3 is moved by a great distance for vibration control.

Condition expression 3 is provided to set the refractive power of the second lens unit L2a-c and the lens sub-unit L3b1-3 so that the entire size of the entire lens system is reduced and excellent optical performance is maintain during decentering.

If the lower limit of the condition expression 3 is surpassed, it becomes difficult to restrict the generation of eccentric aberration during vibration control.

If the upper limit is surpassed, it becomes difficult to compensate for the image plane distortion because the Petzval sum increases in the negative direction.

In at least one exemplary embodiment the range of the condition expressions 1 to 3 are set as follows, encouraging good optical performance while controlling vibration, which can be easily maintained and which the movement of lens sub-unit L3b1-3 can be easily compensated for:

$$0.44 < |f3b/f1| < 0.6 \quad (1b)$$

$$0.55 < |f3b/f3a| < 0.75 \quad (2a)$$

$$2.5 < |f3b/f2| < 3.7 \quad (3a)$$

The condition expression 4 is provided to shorten the entire length of the lens unit while suitably setting the distance the second lens unit L2a-c is moved during zooming and maintaining excellent optical performance within the entire zoom range, i.e., from the wide angle end to the telephoto end.

If the refractive power of the second lens unit L2a-c becomes great so that the lower limit of the condition expression 4 is surpassed, the distance the second lens unit L2a-c is moved during zooming becomes small. Thus, it can be less useful since the Petzval sum increases in the negative direction, making it difficult to compensate for the image plane distortion.

If the upper limit of the condition expression 4 is surpassed, the distance the second lens unit L2a-c is moved during zooming is increased, making it difficult to reduce the entire size of the lens system.

In at least one exemplary embodiment one can set the range of the condition expression 4 as the following:

$$0.5 < |f2|/\sqrt{fw \cdot ft} < 0.56 \quad (4a)$$

The size of an image captured by a solid-state image pick-up device, such as a CCD, used for a video camera or a digital still camera is smaller than that of a silver halide camera.

Furthermore, the image pick-up lens used for such a device has a short focal length with respect to the same photographic field angle. Therefore, the distance Δ the vibration control lens unit is moved to compensate for the same vibration control angle is decreased.

Consequently, if the accuracy of the mechanisms is about the same, the degree of under-compensation of the screen becomes equivalently great.

For a zoom lens system according to the exemplary embodiments below, the vibration control sensitivity TS satisfies the condition expression 5 when the lens sub-unit L3b1-3, which is the vibration control lens unit, is moved in a direction orthogonal to the optical axis while the lens sub-unit L3b1-3 is focused on an object at an infinite distance at the telephoto end.

If the vibration control sensitivity TS is smaller than the lower limit, the lens sub-unit L3b1-3 required for control can be moved a great distance. This is less useful since the size of a driving unit, such as an actuator, for driving the lens sub-unit L3b1-3 will needs to be increased.

In contrast, if the vibration control sensitivity TS is greater than the upper limit of the condition expression 5, the distance Δ the lens sub-unit L3b1-3 is required to be moved for vibration control becomes small. However, in this case, satisfactory vibration control can become difficult, causing under-compensation.

Excellent vibration control performance can be achieved by setting the range of the condition expression 5 as the following:

$$0.7 < TS < 0.9 \quad (5a)$$

At least one exemplary embodiment includes at least one positive lens having an aspherical surface in the lens sub-unit L3b1-3.

Accordingly, according to at least one exemplary embodiment one can reduce eccentric aberration, such as eccentric coma, generated during vibration control.

To compensate for the eccentric lateral chromatic aberration, it can also be useful to include at least one negative lens in the lens sub-unit L3b1-3.

At this time, to maintain the balance of the chromatic aberration compensation of the entire third lens unit L3a-c, one can include at least one positive lens in the lens sub-unit L3a1-3.

For example, the lens sub-unit L3b1-3 includes one positive lens and one compound lens (e.g., by constructed by bonding a positive lens and a negative lens). In this way, the structure of the vibration control lens unit provided to compensate for blurring can be minimized, reducing the size and weight of the vibration control lens unit.

In this way, the size of the actuator for driving the vibration control lens unit can be reduced, reducing the size of the entire unit and reducing electric power consumption during the driving operation.

According to the exemplary embodiments, the first lens unit L1a-c includes one negative lens and two or three positive lenses.

Accordingly, a glass material, which can have a low dispersion value and a low refractive index, can be used for the positive lens, facilitating chromatic aberration to be effectively compensated for at the telephoto end.

The second lens unit L2a-c includes, from the object side to the image side, a negative meniscus lens whose surface on the image side is concave, a negative lens, a positive lens whose surfaces are both convex, and a negative lens whose surface on the object side is concave.

Change in chromatic aberration during zooming is reduced by providing a negative lens on the image side of the positive lens in second lens unit L2a-c.

According to the exemplary embodiments, a lens unit having a small refractive power can be provided at the object side of the first lens unit L1a-c and/or the image side of the fourth lens unit L4a-c.

A tele-converter lens and/or a wide-converter lens can be provided at the object side and/or image side.

As described above, according to the exemplary embodiments, the refractive powers and the lens structures of the lens units are suitably set, and the equivalently small and light lens sub-unit L3b1-3 included as part of the optical system is provided as a vibration control lens unit. Blurring of an image caused by the zoom lens system vibrating (tilting) is compensated for by moving the lens sub-unit L3b1-3 in a direction orthogonal to the optical axis. Accordingly, a zoom lens system that facilitates compensating for eccentric aberration generated when the lens unit is decentered is obtained. Contemporaneously, the size of the entire optical system can be reduced, simplifying the mechanism and reducing the load applied to the driving unit.

For example, according to the exemplary embodiments, a zoom lens system, which can have an equivalently long back focus length suitable for a camera including three image-pickup devices corresponding to the R, G, and B channels, and a color separation optical system, can be obtained.

Furthermore, according to the exemplary embodiments, a zoom lens system having an excellent vibration control performance and a high zoom ratio, such as a zoom ratio of 20 times, can be obtained. Such a zoom lens system can be used for an image pick-up apparatus, such as a video camera or a digital still camera.

The following, first, second, and third numerical examples, corresponding to the first, second, and third exemplary embodiments, respectively, are described. In each example, i represents the number of lens surfaces counted from the object side, Ri represents the radius of curvature of the ith surface, Di represents the distance between the ith surface and the (i+1)th surface, Ni represents the d-line index of refraction of the material which consists the ith lens or an optical block counted from the object side, and vi represent the d-line Abbe number.

In the first to third examples, the six surfaces closest to the image are planes equivalent to an optical block. The aspherical surface shape is represented by the expression below:

$$X = \frac{(1/R)h^2}{1+\sqrt{\{1-(1+k)(h/R)^2\}}} + Bh^4 + Ch^6 + Dh^8 + Eh^{10}$$

where X is displacement in the direction of the optical axis with reference to the surface apex at a height h from the optical axis, R is the paraxial radius of curvature, k is the conical constant, and B, C, D, and E are aspherical surface coefficients.

In the examples, "e-X" represents "x10-x," f represents the focal length, Fno represents the F number, and ω represents the half field angle.

The relationship between the above-described condition expressions and the following examples are shown in Table 1.

First Numeral Example
f = 3.93~78.14   Fno = 1.66~2.88   2ω = 59.8°~3.3°

| | | | | | | |
|---|---|---|---|---|---|---|
| R1 = | 204.858 | D1 = | 2.10 | N1 = | 1.806100 | v1 = 33.3 |
| R2 = | 49.068 | D2 = | 6.60 | N2 = | 1.496999 | v2 = 81.5 |
| R3 = | −498.623 | D3 = | 0.20 | | | |
| R4 = | 58.411 | D4 = | 4.70 | N3 = | 1.487490 | v3 = 70.2 |
| R5 = | −2287.930 | D5 = | 0.20 | | | |
| R6 = | 40.272 | D6 = | 4.40 | N4 = | 1.603112 | v4 = 60.6 |
| R7 = | 126.522 | D7 = | Variable | | | |
| R8 = | 71.967 | D8 = | 0.85 | N5 = | 1.834000 | v5 = 37.2 |
| R9 = | 7.997 | D9 = | 3.88 | | | |
| R10 = | −28.089 | D10 = | 0.75 | N6 = | 1.834000 | v6 = 37.2 |
| R11 = | 40.915 | D11 = | 0.18 | | | |
| R12 = | 16.774 | D12 = | 3.70 | N7 = | 1.846660 | v7 = 23.9 |
| R13 = | −19.434 | D13 = | 0.70 | N8 = | 1.785896 | v8 = 44.2 |
| R14 = | 61.253 | D14 = | Variable | | | |
| R15 = | Aperature Stop | D15 = | 7.20 | | | |
| R16 = | −46.628 | D16 = | 0.65 | N9 = | 1.802997 | v9 = 40.8 |
| R17 = | 14.447 | D17 = | 2.69 | N10 = | 1.805181 | v10 = 25.4 |
| R18 = | −1297.079 | D18 = | 0.50 | | | |
| R19 = | 13.235 (Aspherical) | D19 = | 3.80 | N11 = | 1.583126 | v11 = 59.4 |
| R20 = | −120.701 | D20 = | 0.75 | N12 = | 1.672700 | v12 = 32.1 |
| R21 = | 16.656 | D21 = | 1.14 | | | |
| R22 = | 53.297 | D22 = | 2.20 | N13 = | 1.696797 | v13 = 55.5 |
| R23 = | −32.110 | D23 = | Variable | | | |
| R24 = | 32.618 (Aspherical) | D24 = | 2.50 | N14 = | 1.583126 | v14 = 59.4 |
| R25 = | −181.206 | D25 = | 0.20 | | | |
| R26 = | 17.379 | D26 = | 0.80 | N15 = | 1.846660 | v15 = 23.8 |
| R27 = | 10.521 | D27 = | 4.00 | N16 = | 1.487490 | v16 = 70.2 |
| R28 = | −66.998 | D28 = | 2.00 | | | |
| R29 = | ∞ | D29 = | 0.43 | N17 = | 1.516800 | v17 = 64.2 |
| R30 = | ∞ | D30 = | 2.05 | N18 = | 1.552320 | v18 = 63.4 |
| R31 = | ∞ | D31 = | 0.83 | | | |
| R32 = | ∞ | D32 = | 17.50 | N19 = | 1.516330 | v19 = 64.1 |
| R33 = | ∞ | D33 = | 0.50 | N20 = | 1.556710 | v20 = 58.6 |
| R34 = | ∞ | | | | | |

| | Focal Length | | |
|---|---|---|---|
| Variable Distance | 3.93 | 25.19 | 78.14 |
| D7 | 0.90 | 31.49 | 40.12 |
| D14 | 41.72 | 11.13 | 2.50 |
| D23 | 7.99 | 4.55 | 8.69 |

Aspherical Coefficient

| | | | |
|---|---|---|---|
| R19 | k = −6.91516e−01 | B = −2.24758e−05 | C = 9.13602e−08 |
| | D = −1.54277e−09 | E = 3.15191e−11 | F = −1.86656e−13 |
| R24 | k = 3.70505e+00 | B = −1.05794e−05 | C = 7.17210e−09 |

| Second Numeral Example  f = 4.00~79.83   Fno = 1.66~2.88   2ω = 59.0°~3.2° |||||||
|---|---|---|---|---|---|---|
| R1 = | 218.665 | D1 = | 2.10 | N1 = | 1.806100 | ν1 = 33.3 |
| R2 = | 51.750 | D2 = | 7.19 | N2 = | 1.496999 | ν2 = 81.5 |
| R3 = | −238.257 | D3 = | 0.20 | | | |
| R4 = | 49.649 | D4 = | 5.36 | N3 = | 1.487490 | ν3 = 70.2 |
| R5 = | 1735.093 | D5 = | 0.20 | | | |
| R6 = | 39.329 | D6 = | 3.68 | N4 = | 1.603112 | ν4 = 60.6 |
| R7 = | 82.119 | D7 = | Variable | | | |
| R8 = | 53.938 | D8 = | 0.85 | N5 = | 1.834000 | ν5 = 37.2 |
| R9 = | 7.604 | D9 = | 4.00 | | | |
| R10 = | −33.829 | D10 = | 0.75 | N6 = | 1.834000 | ν6 = 37.2 |
| R11 = | 28.446 | D11 = | 0.38 | | | |
| R12 = | 15.201 | D12 = | 4.11 | N7 = | 1.846660 | ν7 = 23.9 |
| R13 = | −17.513 | D13 = | 0.70 | N8 = | 1.834000 | ν8 = 37.2 |
| R14 = | 59.344 | D14 = | Variable | | | |
| R15 = | Aperature Stop | D15 = | 7.20 | | | |
| R16 = | −87.147 | D16 = | 0.65 | N9 = | 1.882997 | ν9 = 40.8 |
| R17 = | 14.785 | D17 = | 2.78 | N10 = | 1.761821 | ν10 = 26.5 |
| R18 = | −662366.462 | D18 = | 0.5 | | | |
| R19 = | 13.005 (Aspherical) | D19 = | 3.70 | N11 = | 1.583126 | ν11 = 59.4 |
| R20 = | 75.297 | D20 = | 0.80 | N12 = | 1.698947 | ν12 = 30.1 |
| R21 = | 16.037 | D21 = | 1.62 | | | |
| R22 = | 82.352 | D22 = | 2.01 | N13 = | 1.712995 | ν13 = 53.9 |
| R23 = | −36.622 | D23 = | Variable | | | |
| R24 = | 27.666 | D24 = | 2.22 | N14 = | 1.603112 | ν14 = 60.6 |
| R25 = | −100.169 | D25 = | 0.20 | | | |
| R26 = | 22.681 | D26 = | 0.80 | N15 = | 1.846660 | ν15 = 23.9 |
| R27 = | 12.326 | D27 = | 3.59 | N16 = | 1.487490 | ν16 = 70.2 |
| R28 = | −65.795 | D28 = | Variable | | | |
| R29 = | ∞ | D29 = | 0.43 | N17 = | 1.516800 | ν17 = 64.2 |
| R30 = | ∞ | D30 = | 2.05 | N18 = | 1.552320 | ν18 = 63.4 |
| R31 = | ∞ | D31 = | 0.83 | | | |
| R32 = | ∞ | D32 = | 17.50 | N19 = | 1.516330 | ν19 = 64.1 |
| R33 = | ∞ | D33 = | 0.50 | N20 = | 1.556710 | ν20 = 58.6 |
| R34 = | ∞ | | | | | |

| | Focal Length |||
|---|---|---|---|
| Variable Distance | 4.00 | 25.79 | 79.83 |
| D7 | 0.90 | 31.15 | 39.69 |
| D14 | 41.20 | 10.95 | 2.42 |
| D23 | 8.94 | 5.00 | 9.06 |
| D28 | 3.07 | 7.01 | 2.95 |

Aspherical Coefficient

R19   k = −1.00377e+00   B = 9.32334e−06   C = 9.77943e−08   D = 1.68502e−10

| Third Numeral Example  f = 4.10~88.73   Fno = 1.65~2.85   2ω = 57.7°~2.9° |||||||
|---|---|---|---|---|---|---|
| R1 = | 65.066 | D1 = | 1.90 | N1 = | 1.846660 | ν1 = 23.8 |
| R2 = | 42.431 | D2 = | 7.10 | N2 = | 1.496999 | ν2 = 81.5 |
| R3 = | −310.327 | D3 = | 0.20 | | | |
| R4 = | 40.157 | D4 = | 3.80 | N3 = | 1.696797 | ν3 = 55.5 |
| R5 = | 93.377 | D5 = | Variable | | | |
| R6 = | 58.396 | D6 = | 0.90 | N4 = | 1.882997 | ν4 = 40.8 |
| R7 = | 8.741 | D7 = | 4.23 | | | |
| R8 = | −21.541 | D8 = | 0.75 | N5 = | 1.761821 | ν5 = 26.5 |
| R9 = | 187.301 | D9 = | 0.35 | | | |
| R10 = | 18.974 | D10 = | 4.20 | N6 = | 1.922860 | ν6 = 18.9 |
| R11 = | −20.176 | D11 = | 0.31 | | | |
| R12 = | −18.672 | D12 = | 0.71 | N7 = | 1.805181 | ν7 = 25.4 |
| R13 = | 35.012 | D13 = | Variable | | | |
| R14 = | Aperature Stop | D14 = | 7.50 | | | |
| R15 = | −21.054 | D15 = | 0.70 | N8 = | 1.603112 | ν8 = 60.6 |
| R16 = | 24.933 | D16 = | 2.50 | N9 = | 1.688931 | ν9 = 31.1 |
| R17 = | −1012.116 (Aspherical) | D17 = | 0.71 | | | |
| R18 = | 36.316 (Aspherical) | D18 = | 2.00 | N10 = | 1.589130 | ν10 = 61.3 |
| R19 = | −953.633 | D19 = | 0.20 | | | |
| R20 = | 43.271 | D20 = | 0.70 | N11 = | 1.805181 | ν11 = 25.4 |
| R21 = | 23.114 | D21 = | 4.00 | N12 = | 1.487490 | ν12 = 70.2 |
| R22 = | −38.169 (Aspherical) | D22 = | Variable | | | |
| R23 = | 52.162 | D23 = | 2.90 | N13 = | 1.583126 | ν13 = 59.4 |
| R24 = | −33.928 | D24 = | 0.20 | | | |
| R25 = | 23.423 | D25 = | 0.75 | N14 = | 1.761821 | ν14 = 26.5 |
| R26 = | 12.789 | D26 = | 3.80 | N15 = | 1.487490 | ν15 = 70.2 |
| R27 = | −256.958 | D27 = | 1.80 | | | |
| R28 = | ∞ | D28 = | 0.43 | N16 = | 1.516800 | ν16 = 64.2 |
| R29 = | ∞ | D29 = | 2.05 | N17 = | 1.552320 | ν17 = 63.4 |
| R30 = | ∞ | D30 = | 0.83 | | | |

-continued

Third Numeral Example
f = 4.10~88.73   Fno = 1.65~2.85   2ω = 57.7°~2.9°

| R31 = | ∞ | D31 = | 17.00 | N18 = | 1.589130 | ν18 = | 61.2 |
|---|---|---|---|---|---|---|---|
| R32 = | ∞ | D32 = | 0.50 | N19 = | 1.556710 | ν19 = | 58.6 |
| R33 = | ∞ | | | | | | |

| | Focal Length | | |
|---|---|---|---|
| Variable Distance | 4.10 | 27.89 | 88.73 |
| D5 | 0.95 | 33.64 | 42.86 |
| D13 | 44.41 | 11.72 | 2.50 |
| D22 | 7.77 | 3.98 | 8.95 |

Aspherical Coefficient

| R17 | k = 9.07320e+03   B = 1.74727e−05   C = −7.10628e−08 |
| | D = 1.47506e−09 |
| R18 | k = −2.12928e+00   B = −1.05149e−05   C = −1.03948e−07 |
| | D = 1.42193e−09 |
| R23 | k = 2.16614e+01   B = −2.95426e−05   C = 2.18245e−08 |
| | D = −1.59265e−09 |

TABLE 1

| | | Numeral Example | | |
|---|---|---|---|---|
| | Conditional Expression | 1 | 2 | 3 |
| (1) | f3b/f1 | 0.467 | 0.550 | 0.490 |
| (2) | |f3b/f3a| | 0.630 | 0.574 | 0.734 |
| (3) | |f3b/f2| | 2.780 | 3.404 | 3.033 |
| (4) | |f2/√fw·ft| | 0.546 | 0.514 | 0.519 |
| (5) | TS | 0.848 | 0.737 | 0.791 |

Next, a video camera including a zoom lens system according to an exemplary embodiment of the present invention as a photographic optical system will be described with reference to FIG. 13.

FIG. 13 illustrates a video camera body 10, a photographic optical system 11 including a zoom lens system according to an exemplary embodiment of the present invention, a solid-state image pick-up device (photoelectric transducer) 12, such as a CCD sensor or a CMOS sensor, for receiving an image of an object by the photographic optical system 11, a memory 13 for storing information that corresponds to an image of the object photoelectric and being converted by the image pick-up device 12, and a viewfinder for observing the image of the object display on a display device, not shown in the drawing.

The display device is constituted of, for example, a liquid crystal display, and can be used to display the image of the object formed on the image pick-up device 12.

A zoom lens system according to an exemplary embodiment, used in an image pick-up apparatus, such as a video camera, a small image pick-up apparatus having excellent optical characteristics can be obtained.

The zoom lens system according to an exemplary embodiment of the present invention can be employed to a digital still camera in the same manner.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-213051 filed Jul. 22, 2005, which is hereby incorporated by reference herein in its entirety.

What is claimed is:

1. A zoom lens system comprising:
a first lens unit having positive refractive power;
a second lens unit having negative refractive power;
a third lens unit having positive refractive power; and
a fourth lens unit having positive refractive power,
wherein the first to fourth lens units are provided in order from the object side to the image side,
wherein the third lens unit includes a first lens sub-unit having negative refractive power and a second lens sub-unit having positive refractive power, the first and second lens sub-units provided in order from the object side to the image side,
wherein, during zooming, the second lens unit and the fourth lens unit are moved along an optical axis,
wherein the second lens sub-unit is moved in a direction substantially orthogonal to the optical axis so as to displace the image in a direction orthogonal to the optical axis, and
wherein, $0.4 < f3b/f1 < 0.70$ and $0.5 < |f3b/f3a| < 0.8$ where f1 represents the focal length of the first lens unit, f3a represents the focal length of the first lens sub-unit, and f3b represents the focal length of the second lens sub-unit.

2. The zoom lens system according to claim 1, wherein $2.2 < |f3b/f2| < 4.1$ where f2 represents the focal length of the second lens unit.

3. The zoom lens system according to claim 1, wherein $0.45 < |f2/\sqrt{fw \cdot ft}| < 0.58$ where fw represents the focal length of the entire optical system at the wide angle end, ft represents the focal length of the entire optical system at the telephoto end, and f2 represents the focal length of the second lens unit.

4. The zoom lens system according to claim 1, wherein, when the zoom lens system is focused at an object at infinite distance at the telephoto end, $0.6 < TS < 1.0$ where TS represents the eccentricity sensitivity of the image displacement when the second lens sub-unit is moved in a direction substantially orthogonal to the optical axis.

5. The zoom lens system according to claim 1, wherein the second lens sub-unit includes a positive lens having an aspherical surface and a negative lens.

6. The zoom lens system according to claim 1, wherein the first lens sub-unit includes at least one positive lens.

7. The zoom lens system according to claim 1, wherein an image is formed on a solid-state image pick-up device.

8. An image pick-up apparatus comprising:
a zoom lens system according to claim 1; and
a solid-state image pick-up device configured to receive an image formed by the zoom lens system.

* * * * *